United States Patent
Kaltenbach et al.

(10) Patent No.: US 7,463,019 B2
(45) Date of Patent: Dec. 9, 2008

(54) HOUSING FOR MOVEMENT SENSOR WITH PROTECTIVE COVER FOR COMPONENTS

(75) Inventors: Dirk Kaltenbach, Wiesbaden (DE); Harry Skarpil, Dortmund (DE)

(73) Assignee: Siemens Aktiengesellschaft, München (DE)

( * ) Notice: Subject to any disclaimer, the term of this patent is extended or adjusted under 35 U.S.C. 154(b) by 234 days.

(21) Appl. No.: 11/578,984

(22) PCT Filed: Mar. 18, 2005

(86) PCT No.: PCT/EP2005/051266
§ 371 (c)(1),
(2), (4) Date: Oct. 18, 2006

(87) PCT Pub. No.: WO2005/101027
PCT Pub. Date: Oct. 27, 2005

(65) Prior Publication Data
US 2007/0296398 A1    Dec. 27, 2007

(30) Foreign Application Priority Data
Apr. 19, 2004   (DE)   .................. 10 2004 018 869

(51) Int. Cl.
G01P 3/487   (2006.01)
G01B 7/14    (2006.01)
G01R 33/06   (2006.01)
H01L 43/06   (2006.01)

(52) U.S. Cl. .................................. 324/173; 324/207.2

(58) Field of Classification Search ............ 324/207.13, 324/207.15, 207.2, 207.21, 251, 160, 173, 324/174, 178, 180; 338/32 R, 32 H; 29/602.1
See application file for complete search history.

(56) References Cited

U.S. PATENT DOCUMENTS

| | | | |
|---|---|---|---|
| 4,298,769 A | 11/1981 | Richman | |
| 5,585,560 A | 12/1996 | Goossens | |
| 6,025,710 A | 2/2000 | Schneider et al. | |

(Continued)

FOREIGN PATENT DOCUMENTS

DE      38 27 937      2/1990

(Continued)

OTHER PUBLICATIONS

German Office Action dated Jun. 25, 2007 issued in corresponding application No. 10 2004 018 869.6.

*Primary Examiner*—Kenneth J Whittington
(74) *Attorney, Agent, or Firm*—Cohen Pontani Lieberman & Pavane LLP

(57) ABSTRACT

The invention relates to a device for detecting the movement of a movable component, the device having an inner part 1 and the inner part 1 having a housing in which are mounted conductors 3 that carry electrical components 4 and a sensor element. One end of each conductor 3 protrudes from the inner part 1 forming plug contacts 6, and the inner part 1 is encapsulated by a plastic housing 2 in such a way that the plug contacts 6 project into a plug receiver 5 in the plastic housing. The electrical components 4 and the sensor element are covered by covers and encapsulated by the plastic housing 2. The covers protect the components from the plastic in the encapsulation process.

4 Claims, 3 Drawing Sheets

U.S. PATENT DOCUMENTS

| | | |
|---|---|---|
| 6,131,270 A | 10/2000 | Van Den Berg |
| 2002/0109264 A1 | 8/2002 | Lechner |

FOREIGN PATENT DOCUMENTS

| | | |
|---|---|---|
| DE | 42 01 328 | 7/1993 |
| DE | 43 23 084 | 1/1995 |
| DE | 44 22 951 | 1/1996 |
| DE | 197 44 673 | 6/1999 |
| EP | 1 231 824 | 8/2002 |
| JP | 2000088984 | 3/2000 |

HOUSING FOR MOVEMENT SENSOR WITH PROTECTIVE COVER FOR COMPONENTS

CROSS REFERENCE TO RELATED APPLICATIONS

This is a U.S. national stage of application No. PCT/EP2005/051266, filed on 18 Mar. 2005. Priority is claimed on the following application(s): Country: Germany, Application No.: 10 2004 018 869.6, Filed: 19 Apr. 2004.

BACKGROUND OF THE INVENTION

The invention relates to a device for detecting the movement of a movable component, the device having an inner part and the inner part possessing a housing in which conductors are disposed which bear electrical components and a sensor element and which with their one ends protrude from the inner part to form plug contacts, the inner part being encapsulated by injection-molding or casting methods in such a way that the plug contacts project into a plug socket in the plastics housing.

In devices of this type, it is known that, in the injection-molding to encapsulate the inner part with the plastics housing, the electrical components and/or the sensor element are also directly encapsulated. Both during production, as a result of the injection pressure and the high temperatures of the injection-molding compound and the subsequent cooling thereof, and later during operation in the event of temperature fluctuations, the connections of the electrical components and/or of the sensor element are subjected to mechanical load and can become detached.

In sensor elements which react to mechanical load with changes in their electrical properties, the result may be considerable losses in accuracy, or even failure of the device.

Moreover, the thermal and the compressive load can lead to defects in sensitive electrical components.

SUMMARY OF THE INVENTION

An object of the invention is therefore to provide a device of the type stated in the introduction which prevents damage to the electrical components and/or to the sensor element.

This object is achieved according to the invention by the fact that the electrical components and/or the sensor element are covered by covers and are encapsulated by the plastics housing by injection-molding or casting methods.

By virtue of this configuration, the electrical components and/or the sensor element are prevented from coming into contact with the encasing material of the plastics housing, so that the loads which are generated in the encasing operation, as a result of the pressure applications which arise during the injection-molding or casting and concurrent or subsequent thermally-induced expansion processes of the encasing compound, are kept remote from the electrical components and/or the sensor element. Damage caused by loads of this type is thus at least largely prevented.

The manufacturability of the device is here particularly simple if the inner part has one or more chambers in which the electrical components and/or the sensor element are disposed, the chambers being closed off by the covers in the direction of the exterior of the inner part and being encapsulated by the plastics housing by injection-molding or casting methods.

In simple configuration, the covers can here be caps which close off the chambers.

An undisturbed flowing of the plastic during the encapsulation of the inner part is achieved by virtue of the fact that the caps possess an outer contour which, in the installation position of the cap, at least broadly corresponds to the outer contour of the inner part which surrounds the chamber.

For the securement of the caps in their installation position, the caps can be held in their installation position on the inner part by means of a latching connection.

A reduction in components and in the complexity of assembly is obtained if the cap and the inner part consist of a plastic and the cap, at one of its marginal regions, is connected to the inner part by means of a film hinge.

A simple and stable manufacture is obtained if the conductors are formed by a metal stamping (leadframe) and the electrical components, as well as the sensor element, are welded or soldered to the conductors.

The sensor element can be a Hall element, which is disposed at that end region of the conductors which is opposite to the plug contacts.

BRIEF DESCRIPTION OF THE DRAWINGS

An illustrative embodiment of the invention is represented in the drawing and is described in greater detail below, wherein.

DETAILED DESCRIPTION OF THE PRESENTLY PREFERRED EMBODIMENTS

Figure 1:
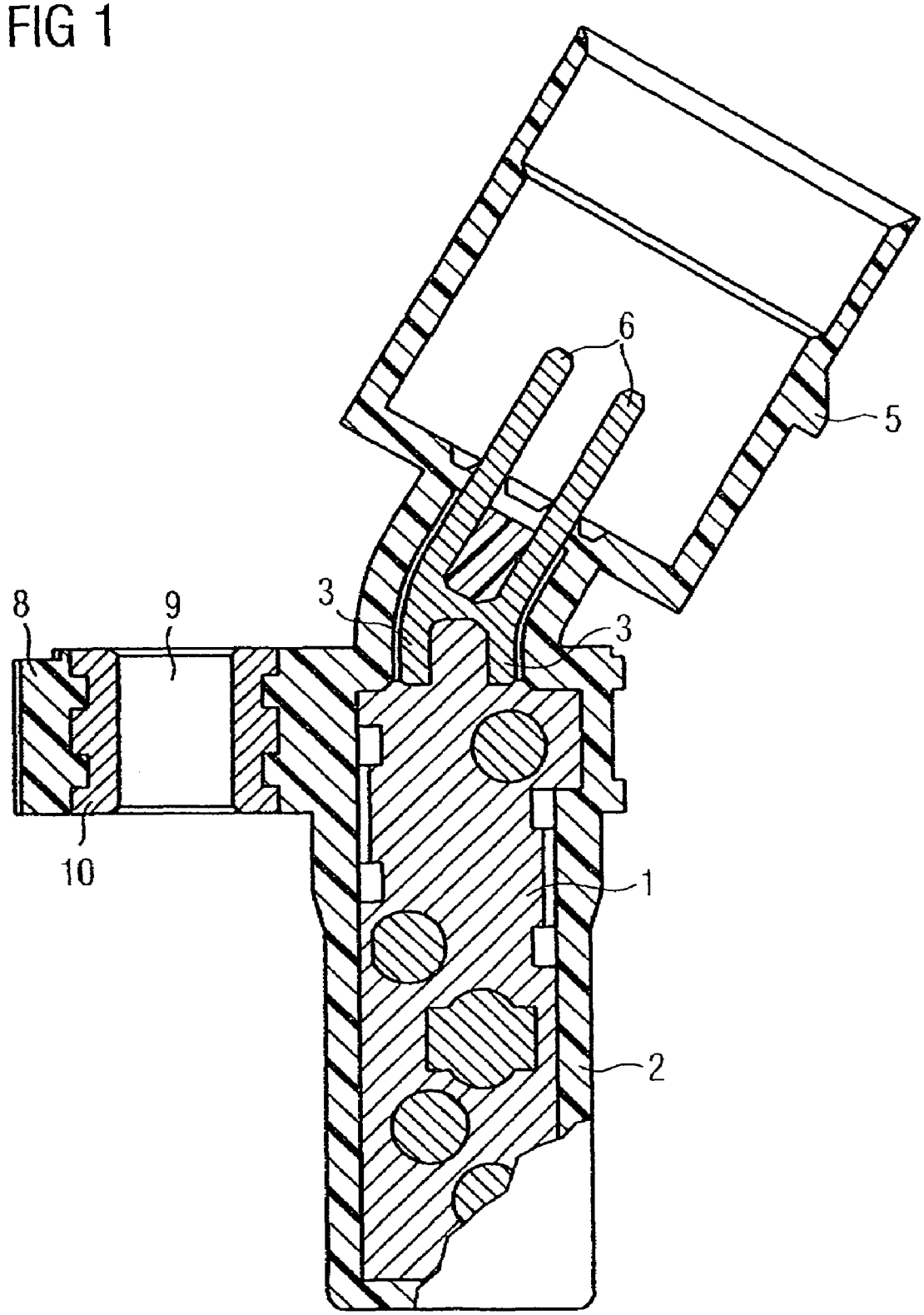
FIG. 1 is a sectional view of a rotational-speed sensor according to an embodiment of the invention in section.
Figure 2:
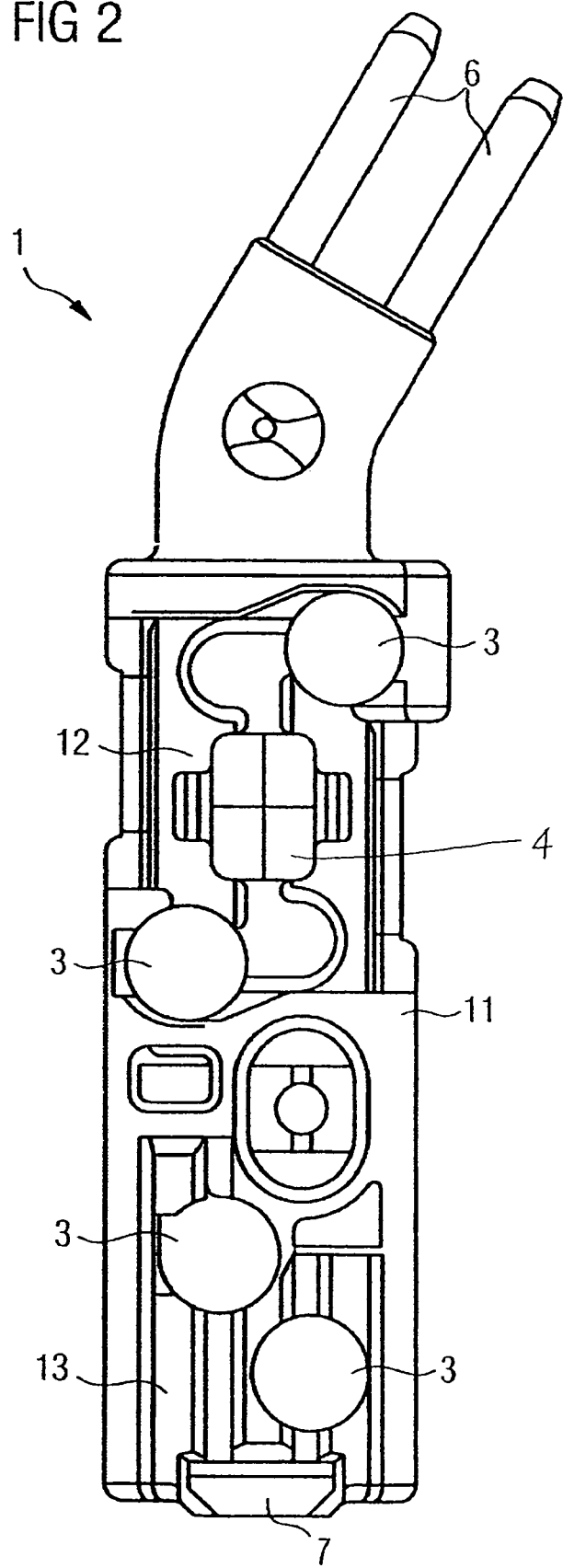
FIG. 2 is a side view of an inner part of the rotational-speed sensor according to FIG. 1, with open chambers.

The rotational-speed sensor represented in the figures is used to detect the rotational speed of a magnetically coded wheel (not represented) by generation of corresponding pulses. As shown in FIGS. 1-2, the rotational-speed sensor possesses a plastics inner part 1, which, through encapsulation with a plastics injection-molding compound, is disposed in a plastics housing 2. The inner part 1 has inside it conductors 3, which are configured as a metal stamping and on which electrical components 4 are disposed by welding. These electrical components 4 are located in a chamber 12 configured in the inner part 1.

The one ends of the conductors 3 project into a plug socket 5 in the plastics housing 2 and form plug contacts 6.

At those ends of the conductors 3 which are opposite to the plug contacts 6 there is disposed, likewise by welding, a Hall element 7, which is likewise located in a chamber 13 of the inner part 1.

In a region close to the plug socket 5, the plastics housing 2 possesses a fastening flange 8, molded on in one piece, comprising an injection-molded metal bushing 10 having a fastening bore 9.

Large regions of the inner part are encapsulated with a plastic forming the housing 2, that region of the inner part 1 which is opposite to the plug socket 5 possessing an approximately pillar-like outer contour.

Figure 3:
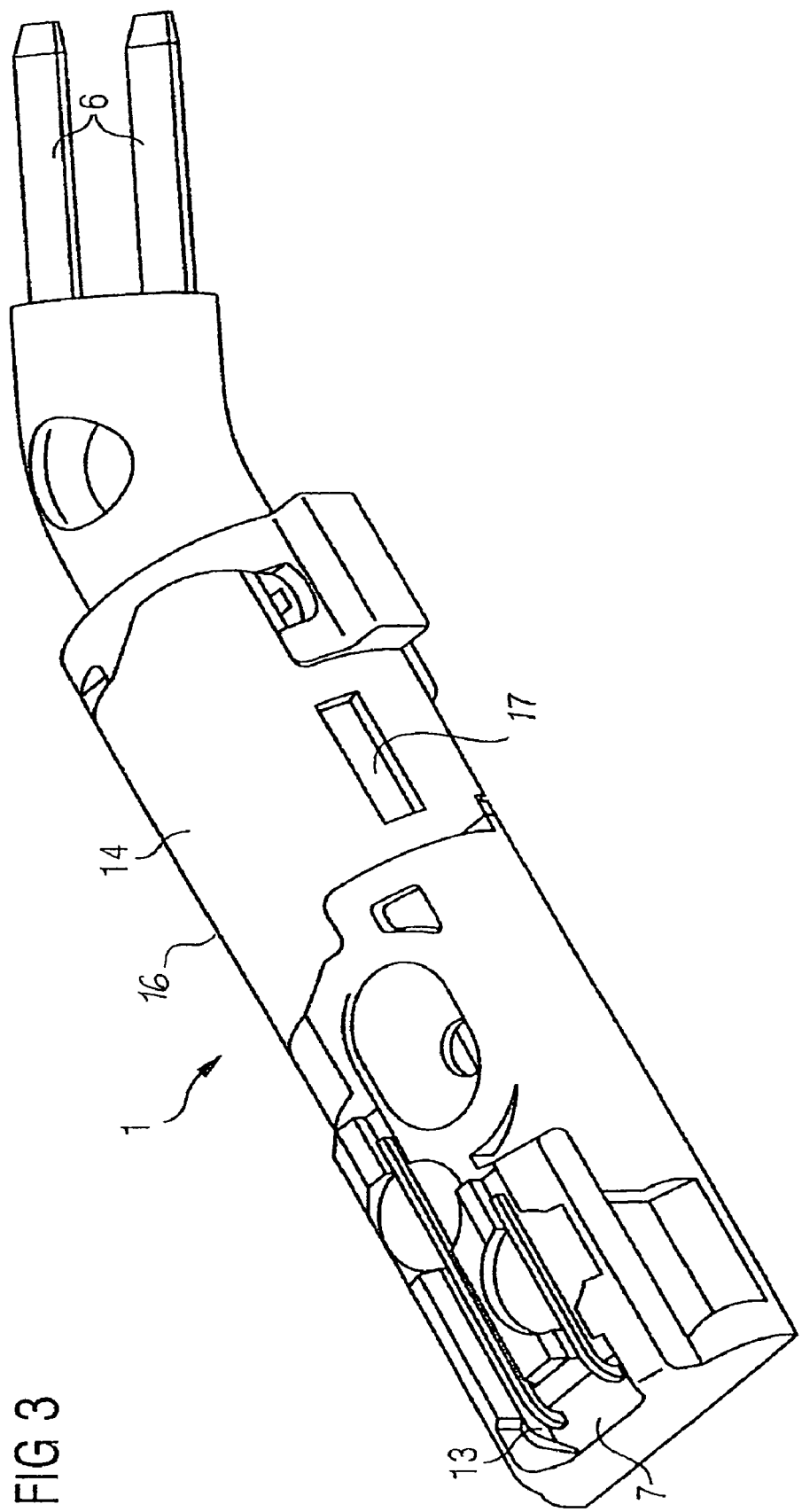
FIG. 3 is a perspective view of the inner part according to FIG. 2, with a covered chamber.

As is represented in FIG. 3, the chamber 12 is closed off by a plastics cap 14, which possesses an outer contour which, in the installation position of the cap 14, corresponds to the outer contour of the inner part 1 which surrounds the chamber 12.

The cap 14 is connected to the inner part 1 by a living hinge 16 and held in the illustration position by a latching connection 17.

The chamber 13 is not yet closed off by a cap in FIG. 3.

What is claimed is:

1. A device for detecting movement of a movable component, said device comprising:
   an inner part encapsulated by injection-molding or casting a housing with at least one chamber and a plug socket;
   at least one conductor disposed in said housing and bearing an electrical component and a sensor element, said electrical component and said sensor each being disposed in said at least one chamber, said at least one conductor having an end protruding from said plug socket of said inner part to form a plug contact; and
   a cap closing the at least one chamber and having an outer contour corresponding to an outer contour of said inner part surrounding said at least one chamber, wherein said cap and the inner part are plastic and said cap is connected to said inner part by a film hinge.

2. The device of claim 1, wherein said cap is held in an installation position on said inner part by a latching connection.

3. The device of claim 1, wherein said at least one conductor is formed by a metal stamping and each of said electrical component and said sensor element is welded or soldered to said at least one conductor.

4. The device of claim 1, wherein said sensor element comprises a Hall element and is disposed at an end of said at least one conductor that is opposite from the end forming said plug contact.

* * * * *